US006667868B2

(12) United States Patent
Portaluri et al.

(10) Patent No.: US 6,667,868 B2
(45) Date of Patent: Dec. 23, 2003

(54) THERMAL SHUTDOWN CONTROL FOR MULTI-CHANNEL INTEGRATED CIRCUIT BOARDS

(75) Inventors: Salvatore Portaluri, Pavia (IT); Marco Demicheli, Binago (IT)

(73) Assignee: Maxim Integrated Products, Inc., Sunnyvale, CA (US)

( * ) Notice: Subject to any disclaimer, the term of this patent is extended or adjusted under 35 U.S.C. 154(b) by 87 days.

(21) Appl. No.: 09/970,540

(22) Filed: Oct. 3, 2001

(65) Prior Publication Data

US 2003/0063423 A1 Apr. 3, 2003

(51) Int. Cl.[7] .................................................. H02H 5/04

(52) U.S. Cl. ....................................... 361/103; 361/114

(58) Field of Search ................................. 361/103, 111, 361/93.8; 232/237, 246; 307/140

(56) References Cited

U.S. PATENT DOCUMENTS

| | | | |
|---|---|---|---|
| 5,099,381 A | | 3/1992 | Wilcox |
| 5,119,265 A | * | 6/1992 | Qualich et al. ............. 361/103 |
| 5,206,778 A | | 4/1993 | Flynn et al. |
| 5,239,255 A | * | 8/1993 | Shanin et al. ............... 323/237 |
| 5,267,118 A | | 11/1993 | Marshall et al. |
| 5,285,346 A | | 2/1994 | Davies et al. |
| 5,448,174 A | | 9/1995 | Gose et al. |
| 5,600,575 A | * | 2/1997 | Anticole ...................... 364/557 |
| 5,675,297 A | * | 10/1997 | Gose et al. .................. 332/109 |
| 5,710,515 A | * | 1/1998 | Teggatz et al. ............. 324/763 |
| 5,796,280 A | | 8/1998 | Tuozzolo |
| 5,805,403 A | | 9/1998 | Chemla |
| 5,838,187 A | | 11/1998 | Embree |
| 6,098,132 A | * | 8/2000 | Olarig et al. ................ 710/103 |
| 6,199,173 B1 | * | 3/2001 | Johnson et al. ................. 714/4 |

FOREIGN PATENT DOCUMENTS

WO  WO98/49761  11/1998

OTHER PUBLICATIONS

Abstract from European Application Publication No. 0797137, Lavaughn, "A Power Switch", Sep. 24, 1997.
Abstract from European Patent Application Publication No. 00427085, Wilcox, "Enable Circuit With Embedded Thermal Turn–Off", May 15, 1991.
Exemplary claim from European Patent No. 00398901/EP 81, DeVito, "Interface Circuit For Linear Variable Differential Transformer", Aug. 4, 1993.
Abstract from Japanese Patent Application No. 09001059, Hara, "Thermal Shutdown Circuit", Jul. 31, 1998.
Abstract from U.S. Patent No. 6,101,610, Beebe, "Computer System Having Sensing With Dual Voltage Sources For Sensor Stabilization", Aug. 8, 2000.
Abstract from U.S. Patent No. 6,016,050, Brokaw, "Start–up And Bias Circuit", Jan. 18, 2000.

(List continued on next page.)

Primary Examiner—Brian Sircus
Assistant Examiner—Z Kitov
(74) Attorney, Agent, or Firm—Perkins Coie LLP

(57) ABSTRACT

A multi-channel power shut-down circuit that includes a plurality of channel disabler circuits formed on a common substrate where each of the channel disabler circuits includes a first combinational logic and a second combinational logic having an input coupled to an output of the first combinational logic and having a channel disable output, and a channel overcurrent detector coupled to an input of the first combinational logic. A thermal warning detector is also formed on the common substrate and coupled to the inputs of the first combinational logic of the plurality of channel disabler circuits. A thermal shutdown detector formed on the common substrate and coupled to the inputs of the second combinational logic of the plurality of channel disabler circuits.

12 Claims, 4 Drawing Sheets

OTHER PUBLICATIONS

Abstract from U.S. Patent No. 5,946,182, Gibson, "Thermal Shutdown And Method For Sensing Thermal Gradients To Extrapolate Hot Spot Temperature", Aug. 31, 1999.

Abstract from U.S. Patent No. 5,907,233, Jabaji, "Voltage Regulator With Improved Field Coil Current Control System And Warning System", May 25, 1999.

Abstract from U.S. Patent No. 5,881,251, Fung, "Hot Swap Control Circuit", Oct. 10, 1996.

Abstract from U.S. Patent No. 5,862,394, Watts, "Electronic Apparatus Having A Software Controlled Power Switch", Jan. 19, 1999.

Abstract from U.S. Patent No. 5,838,187, Embree, "Integrated Circuit Thermal Shutdown System Utilizing A Thermal Sensor", Nov. 17, 1998.

Abstract from U.S. Patent No. 5,832,282, Pate, "Method and Apparatus For Implementing Protected Battery Hot Swapping in Portable Computers", Nov. 3, 1998.

Abstract from U.S. Patent No. 5,805,403, Chemla, "Integrated Circuits Temperature Monitoring And Protection System", Sep. 8, 1998.

Abstract from U.S. Patent No. 5,796,280, Tuozzolo, "Thermal Limit Circuit With Built–in Hysteresis", Aug. 18, 1998.

Abstract from U.S. Patent No. 5,740,378, Rehl, "Hot Swap Bus Architecture", Apr. 14, 1998.

Abstract from U.S. Patent No. 5,737,170, Moyer, "Thermal Shutdown Circuit Using A Pair Of Scaled Transistors", Apr. 7, 1998.

Abstract from U.S. Patent No. 5,675,297, Gose, "Integrated Pulse–Width Modulation Circuit With Thermal Shutdown Circuit", Oct. 7, 1997.

Abstract from U.S. Patent No. 5,664,119, Jeffries, "Local Proactive Hot Swap Request/Acknowledge System", Sep. 2, 1997.

Abstract from U.S. Patent No. 5,640,059, Kammiller, "Power Supply System Including Thermal Current Limiting Protection", Jun. 17, 1997.

Abstract from U.S. Patent No. 5,615,077, Takizawa, "Active Terminator The Shutdown Of Whick Can Be Detected", Mar. 25, 1997.

Abstract from U.S. Patent No. 5,579,491, Jeffries, "Local Proactive Hot Swap Request/Acknowledge System", Nov. 26, 1996.

Abstract from U.S. Patent No. 5,568,373, Small, "Tolerant Power Converter", Oct. 22, 1996.

Abstract from U.S. Patent No. 5,448,174, Gose, "Protective Circuit Having Enhanced Thermal Shutdown", Sep. 5, 1995.

Abstract from U.S. Patent No. 5,298,851, Denardis, "Multiple Application Voltage Regulator System and Method", Mar. 29, 1994.

Abstract from U.S. Patent No. 5,285,346, Davies, "Current Driven Control for a Power Device", Feb. 8, 1994.

Abstract from U.S. Patent No. 5,267,118, Marshall, "Method and Apparatus for Thermally Separating Devices on a Power Integrated Circuit", Nov. 30, 1993.

Abstract from U.S. Patent No. 5,206,778, Flynn, "Sense Circuit for On–Chip Thermal Shutdown", Apr. 27, 1993.

Abstract from U.S. Patent No. 5,099,381, Wilcox, "Enable Circuit with Embedded Thermal Turn–Off", Mar. 23, 1992.

Abstract from U.S. Patent No. 5,087,894, DeVito, "Monolithic Interface Circuit for Linear Variable Differential Transformers", Feb. 11, 1992.

Abstract from U.S. Patent No. 4,907,117, Pease, "Integrated Circuit Thermal Limit", Mar. 6, 1990.

Abstract from U.S. Patent No. 4,800,331, Vesce, "Linear Current Limiter with Temperature Shutdown", Jan. 24, 1989.

Abstract from U.S. Patent No. 4,669,026, Widlar, "Power Transistor Thermal Shutdown Circuit", May 26, 1987.

Abstract from U.S. Patent No. 4,667,265, Stanojevic, "Adaptive Thermal Shutdown Circuit", May 19, 1987.

Abstract from U.S. Patent No. 4,553,048, Bynum, "Monolithically Integrated Thermal Shut–Down Circuit Including a Well Regulated Current Source", Nov. 12, 1985.

Abstract from U.S. Patent No. 4,345,218, Congdon, "Two Stage Thermal Shutdown", Aug. 17, 1982.

Abstract from U.S. Patent No. 4,222,087, Goodrich, "Passive Triac Output Asymmetry Detector", Sep. 9, 1980.

Abstract from U.S. Patent No. 4,185,264, Baker, "Isolated B +Voltage Sensing, High–Voltage Shutdown", Jan. 22, 1980.

Abstract from U.S. Patent No. 4.027,202, Tyler, "Voltage Protection Circuit", May 31, 1977.

Abstract from U.S. Patent No. 4.021,701, Davies, "Transistor Protection Circuit", May 3, 1977.

Abstract from U.S. Patent No. 3,959,713, Davis, "Solid State Current Limit Circuit", May 25, 1976.

Abstract from PCT Patent Application No. 09959067 WO, Hill, "Method for Switching Between Multiple System Hosts", Nov. 18, 1999.

Abstract from PCT Patent Application No. 09849761 WO, Gibson, "Thermal Shutdown Circuit and Method for Sensing Thermal Gradients to Extrapolate Hot Spot Temperature", Nov. 5, 1998.

Abstract from PCT Patent Application Publication No. 09707465 WO, Rehl, "Hot Swap Bus Architecture", Feb. 27, 1997.

Abstract from Japan Application Publication No. 05153727 JP, Tomihara, "Power Study", Jun. 18, 1993.

Abstract from Japan Patent Application No. 02060228 JP, Otani, "Drive Circuit Having Thermal Shutdown Circuit", Feb. 28, 1990.

Abstract from Japan Patent Application Publication No. 02003947, JP, Shiozu, "Semiconductor Device", Jan. 9, 1990.

Abstract from Japan Patent Application Publication No. 62201089 JP, Kusakabe, "Thermal Shut–Down Circuit for Integrated Circuit", Sep. 4, 1987.

Abstract from Japan Patent Application Publication No. 62128307 JP, Haga, "Thermal Protection Circuit", Jun. 10, 1987.

Abstract from Japan Patent Application Publication No. 60152109 JP, Kato, "Amplifier Circuit", Aug. 10, 1985.

Abstract from Japan Patent Application Publication No. 53136648 JP, Sato, "Temperature Control Circuit for Switching Regulator", Nov. 29, 1978.

* cited by examiner

THERMAL SHUTDOWN CONTROL FOR MULTI-CHANNEL INTEGRATED CIRCUIT BOARDS

FIELD OF THE INVENTION

The present invention relates to thermal shutdown control on computer boards and more particularly to thermal shutdown control for motherboards having a number of channels receptive to daughterboards.

BACKGROUND OF THE INVENTION

Motherboards in modem electronic systems can carry one or more daughterboards, each of which can plug into the motherboard. These daughterboards receive power from and exchange signals with the motherboard. During operation, various conditions can occur that can damage the daughterboards, including overly high operating temperatures and over-current conditions. To replace the damaged daughterboards, the entire power supply for the motherboard often needs to be turned off to prevent damage to the motherboard.

In the past, circuits were developed to monitor temperature and over-current conditions in an attempt to prevent damage from occurring to the daughterboards. For example, when an over-temperature and/or over-current condition occurred, the power to that daughterboard could be turned off. While these circuits may successfully protect the daughterboards from damage, it required increasing the motherboard size and component count. This resulted in increased costs because each daughterboard required its own chip to monitor for temperature and current and to provide power shutdown abilities. Additionally, when a fault condition occurred (due to a defective daughterboard), the power to the entire motherboard had to be shut off to allow the replacement of the defective daughterboard. Unfortunately, this also shutoff power to all of the daughterboards carried by the motherboard. Replacing a daughterboard with power still applied could potentially cause a short circuit and overload the main power supply.

Accordingly, what is needed is a way to monitor for over-temperature and overcurrent conditions to daughterboards while minimizing additional board space and component count. Also, the ability to replace individual daughterboards while the main power supply is on is also needed (also referred to as 'hot-swapping').

SUMMARY OF THE INVENTION

The present invention provides an improved circuit and method for shutting down power to individual channels on an electronics board, without greatly increasing board size and component count.

A multi-channel power shut-down circuit in accordance with the present invention includes a plurality of channel disabler circuits formed on a common substrate. Each of the channel disabler circuits includes a first combinational logic and a second combinational logic having an input coupled to an output of the first combinational logic. A channel disable output and a channel overcurrent detector are coupled to an input of the first combinational logic. A thermal warning detector is formed on the common substrate and is coupled to the inputs of the first combinational logic of the plurality of channel disabler circuits. A thermal shutdown detector formed on the common substrate and is coupled to the inputs of the second combinational logic of the plurality of channel disabler circuits.

A method in accordance with the present invention for powering down multiple channels including individually monitoring each of a plurality of channels for an overcurrent condition. A thermal warning signal is developed at a first temperature and a thermal shutdown signal is developed at a second temperature greater than the first temperature. A channel is shutdown upon an occurrence of an overcurrent condition for that channel and upon an occurrence of a thermal warning signal. All channels are shutdown upon an occurrence of the thermal shutdown signal.

The present invention therefore provides an improved circuit and method for shutting down power to individual channels on an electronics board. The present invention provides less expensive, more compact and more reliable electronics to be built and maintained. Furthermore, the present invention allows for all of the channels to be shutdown simultaneously if a sufficiently adverse operating condition is detected.

These and other advantages of the invention will become apparent upon a reading of the following descriptions and a study of the various figures of the drawings.

DETAILED DESCRIPTION OF THE INVENTION

Figure 1:
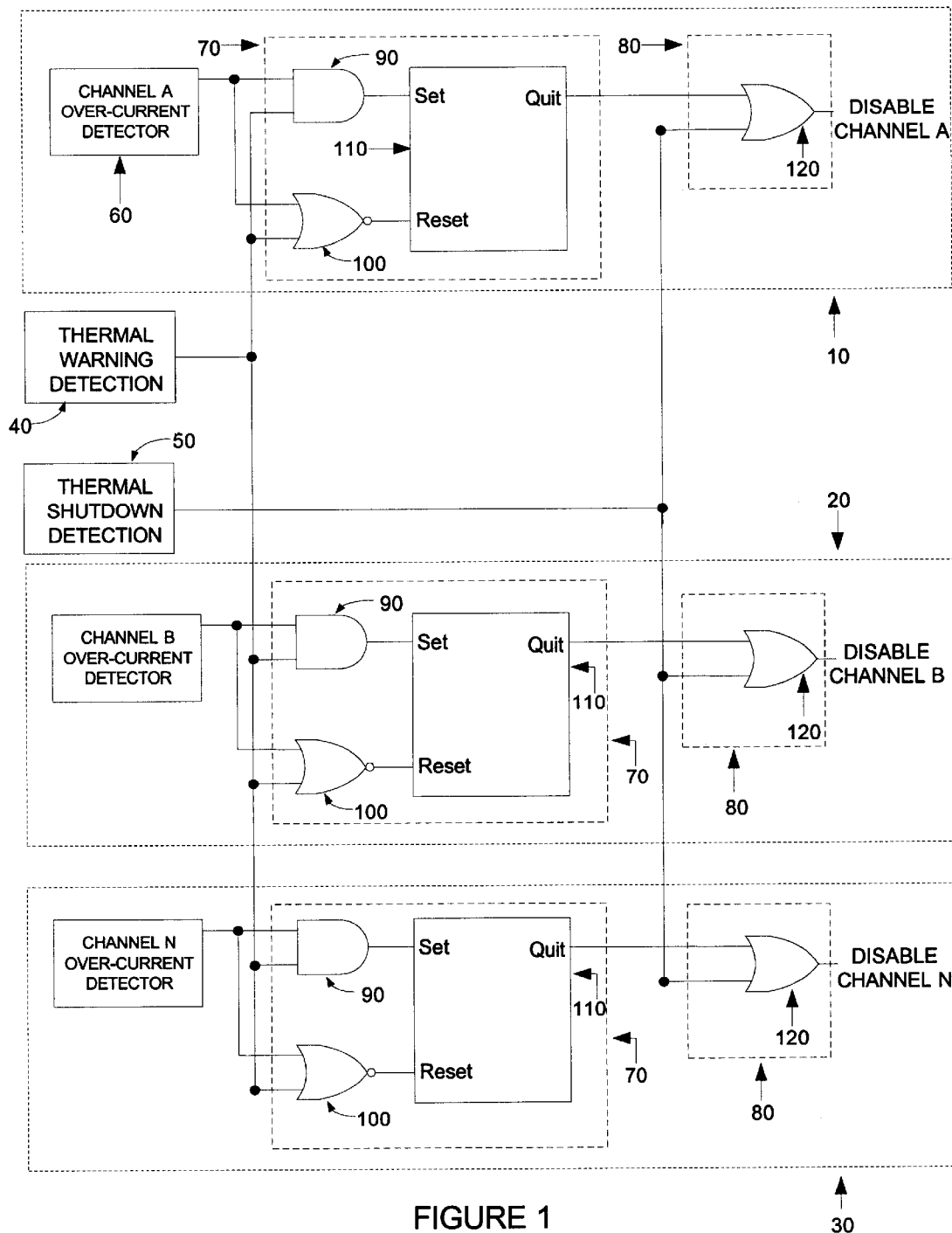
FIG. 1 is a schematic of a multi-channel thermal shutdown logic circuit of the present invention.

FIG. 1 is a schematic diagram a multi-channel thermal shutdown logic circuit of the present invention. It comprises several components including channel A shutdown logic 10, channel B shutdown logic 20, channel N shutdown logic 30, thermal warning detection 40 and thermal shutdown protection 50. Channel A, B through N represents the shutdown logic corresponding to individual daughterboards (each channel has its own set). As used herein, "channel" and "daughterboard" are used somewhat synonymously although it is understood that a daughterboard plugs into a channel socket attached to the motherboard. Thus the invention can be implemented for any number of daughterboards plugged into a motherboard.

Contained within channel A shutdown logic 10, there is the channel A overcurrent detector 60, first combinational logic 70 and second combinational logic 80. Each channel has the same component setup as channel A-channel B is the same, channel N is the same, and so on.

The first combinational logic 70 preferably includes an AND gate 90, a NOR gate 100 and a flip flop 110. The output of the AND gate 90 is connected to the Set input of the flipflop 110 and has one input connected to the channel A overcurrent detector 60 and another input connected to the thermal warning detector 40. The output of the NOR gate 100 is connected to the Reset input of the flipflop 110 and has one input connected to the channel A overcurrent detector 60 and another input connected to the thermal warning detection 40. The Quit output of flipflop 110 is connected to an input of the second combinational logic 80.

The second combinational logic 80 comprises an OR gate 120 which has one input connected to the output of the first combinational logic 70 (the output of the first combinational logic 70 is the same as the Quit output of the flipflop 110). The other input of the OR gate 120 is connected to the output of the thermal shutdown detection 50.

The thermal warning detection 40 is connected to one input of each AND gate 90 and NOR gate 100 contained in each first combinational logic 70 for each channel. The thermal shutdown detection 50 is connected to one input of every OR gate 120 contained in each second combinational logic 120 for each channel. The threshold for turning on the thermal warning detection 40 and the thermal shutdown detection 50 are set at two different temperatures. The thermal shutdown detector 50 is set at a higher temperature.

In operation, when the current to a particular channel starts to increase, there is a corresponding increase in temperature. If an overcurrent condition is detected by the channel A overcurrent detector 60, a high signal is sent out. At the same time, it is likely that the temperature is rising and the thermal warning detection 40 will send out a high signal once the preset temperature is reached. Since two high signals are received at the AND gate 90, a high output is sent to the set input of the flipflop 110. Since both the inputs at the NOR gate 100 are high as well, it will continue to send out a low signal. The flipflop 110 sends out a high signal since the set input received a high signal. Concurrently, the higher temperature threshold of the thermal shutdown detection 50 has not been reached and thus it continues to send out a low signal to the OR gate 120. The OR gate 120 is now receiving a high signal from the flipflop 110 and a low signal from the thermal shutdown detection 50. This results in a high signal output and the power to channel A is disabled.

If the temperature continues to increase, channel A will continue to be disabled and eventually the threshold for the thermal shutdown detection 50 will be reached. At this point, the thermal shutdown detection 50 sends out a high signal which is received at all of the OR gates 120. As a result, all the channels are shut down.

Once the temperature and current start to decrease, all of the channels will turn back on once the overcurrent detectors 60, thermal warning detector 40 and the thermal shutdown detection 50 goes low. Applied specifically to channel A, the AND gate 90 will have low signal inputs and will thus have a low signal output. The NOR gate 100 will also have two low signal inputs and will therefore send a high signal output to the reset input of the flipflop 110. This causes the quit output of the flipflop 110 to go low. At the OR gate 120, both inputs are low-low inputs from the thermal shutdown detection 50 and flipflop 110. Thus the output of channel A 10, as well as all the other channels turn back on.

Figure 2:
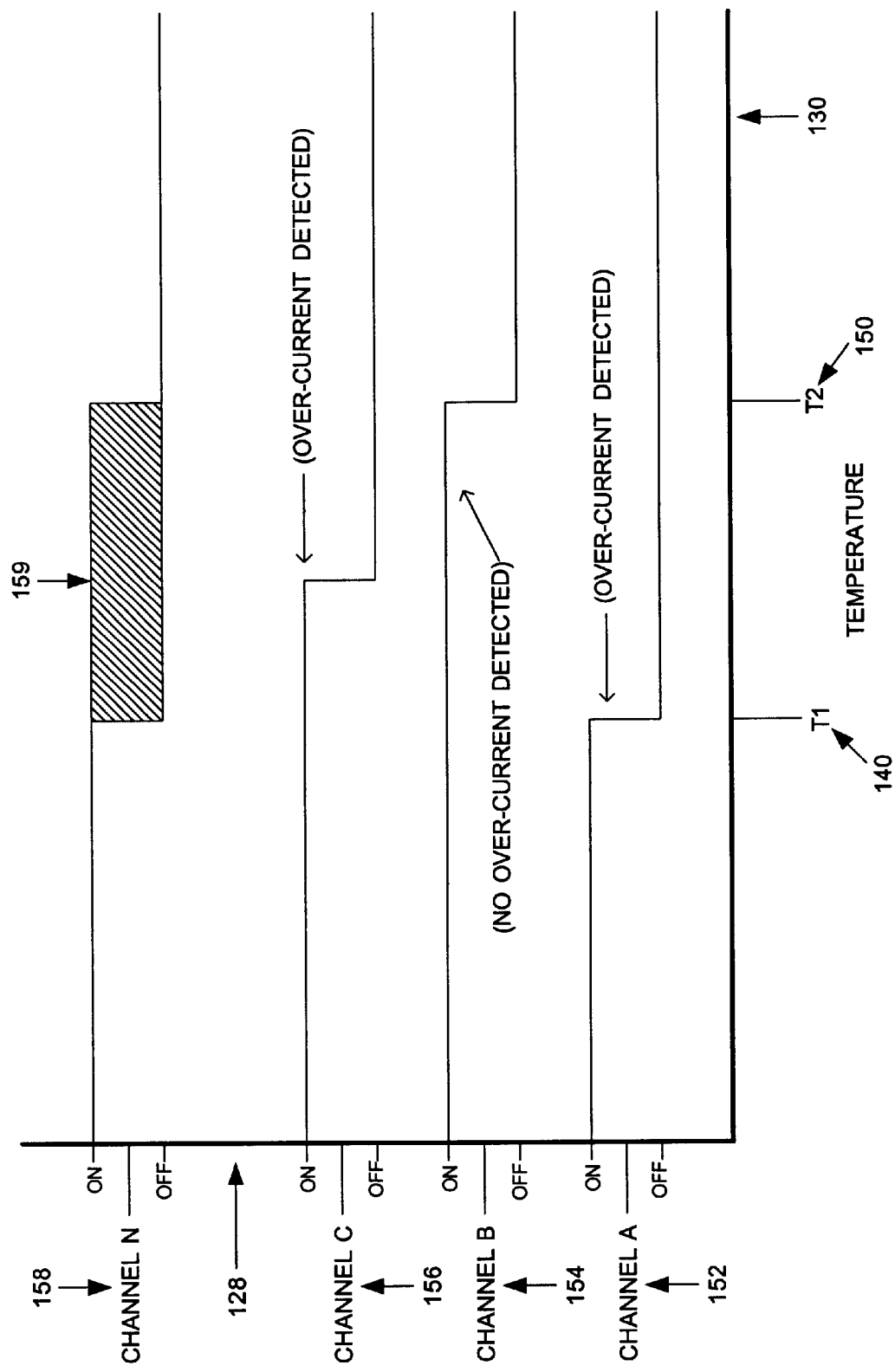
FIG. 2 is a diagram illustrating power being supplied to various channels under different temperature conditions.

The invention can further be appreciated with reference to FIG. 2 which depicts a temperature diagram and the flow of power to each channel. The vertical axis 128 represents power flow to each of the individual channels (channel A 152, channel B 154, channel C 156 and channel N 158). It should be noted that the vertical axis 128 is organized into sections defined by each channel. In other words, the channels located above channel A 152 on vertical axis 128 do not operate at a higher power level than channel A 152. Rather, each channel operates at the same power level when turned on or off. The horizontal axis 130 represents temperature and more specifically, T1 140 represents the threshold for the thermal warning detection 40 and T2 150 represents the higher threshold for the thermal shutdown detection 50.

Below temperature T1 140, all the channels are on. As the T1 140 temperature threshold is reached, an over-current is detected at channel A 152. This results in the power to channel A 152 being shut off. On channel B 154 and channel C 156, no over-current is detected so it continues to operate as normal.

As the temperature continues to rise, but well before temperature T2 150 is reached, an over-current is detected at channel C 156 and thus its power is shutdown. Meanwhile at channel B 154, no over-current is detected so it continues to function as before. Finally the temperature T2 150 is reached and the power is shutdown to all channels. The shaded box 159 on channel N represents that other channels can still have power turned on to them even though power to other channels have been shutoff.

While the function of this invention was described in terms of high and low signal inputs and outputs, it will be readily appreciated by one skilled in the art that a variety of signal types could be used and still achieve the same function. For example, the output signal to shutdown the channels could be defined as a logic level low instead of a logic level high as described above, or with multi-level logic.

Figure 3:
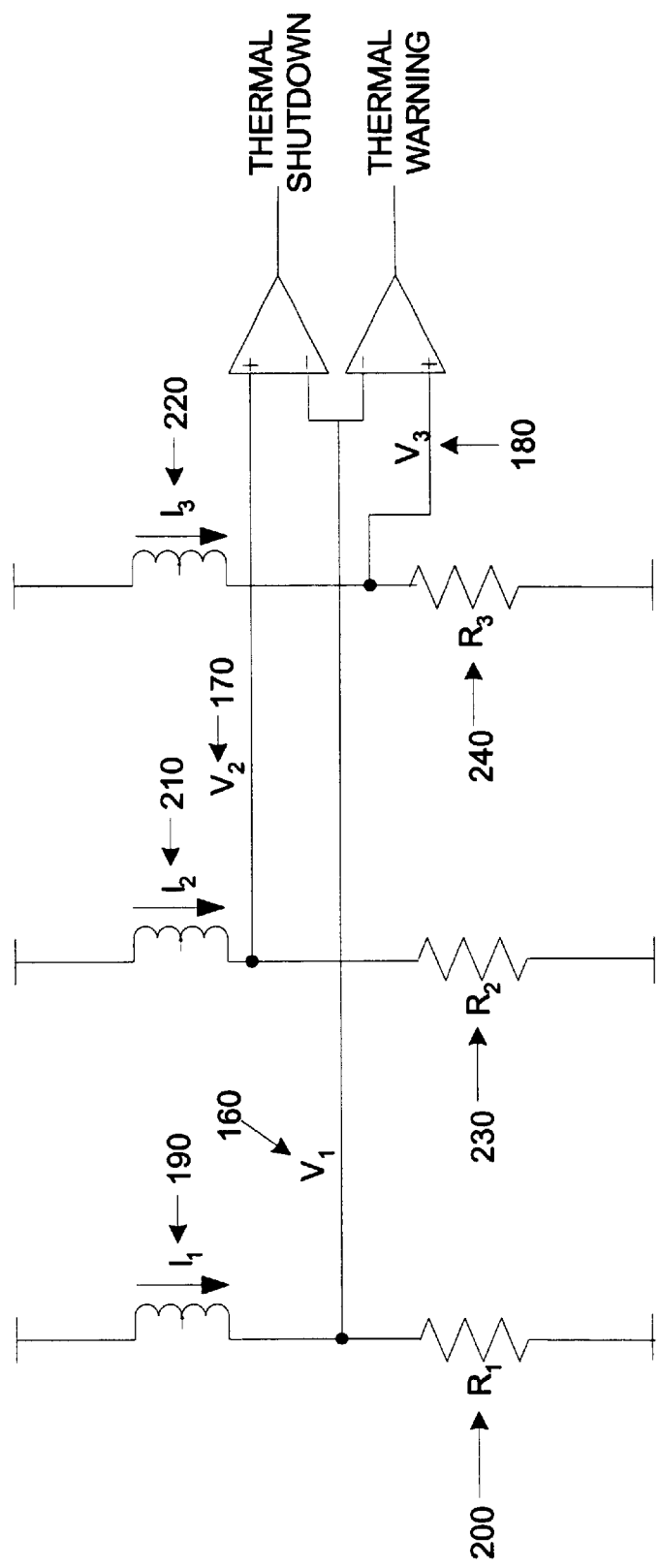
FIG. 3 is an example of a thermal threshold detector that can be used in the present invention.

FIG. 3 is an exemplary implementation of a thermal threshold detector useful in the present invention. This implementation may be used for the thermal warning detection 40 and the thermal shutdown detection 50. Voltage level $V_1$ 160 is constant with temperature. Voltage levels $V_2$ 170 and $V_3$ 180 are directly proportional to temperature. Current $I_1$ 190 is determined by the following formula:

$$I_1 = V_{BG}/R_1$$

$V_{BG}$ is the voltage due to the bandgap of silicon and $R_1$ 200 is a resistance. Currents $I_2$ 210 and $I_3$ 220 are similarly determined using resistors $R_2$ 230 and $R_3$ 240, but instead of the bandgap voltage reference they use a temperature dependent voltage:

$$I_2 = V_T/R_2$$

$$I_3 = V_T/R_3$$

Figure 4:
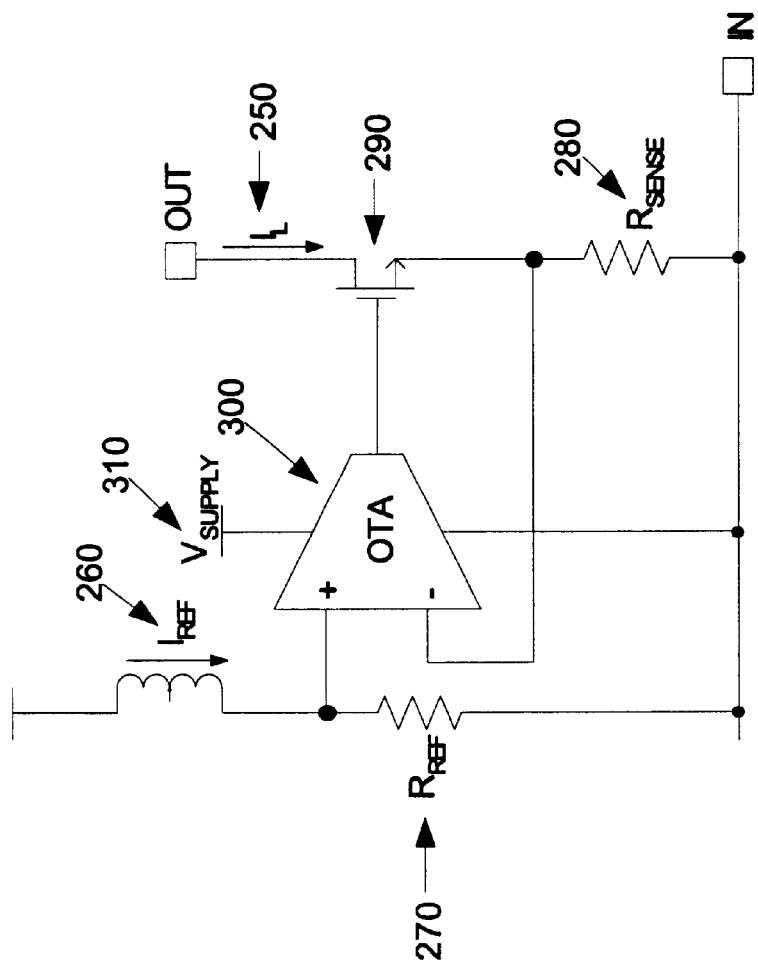
FIG. 4 is an example of an over-current detector that can be used in the present invention.

FIG. 4 is an exemplary implementation of an over-current detector, such as over-current detector 60. The circuit depicted operates in two different modes. In switch mode, the current $I_L$ 250 is less than the current $I_{REF}$ 260:

$$I_L \cdot R_{SENSE} < I_{REF} \cdot R_{REF} \rightarrow I_L < I_{REF} R_{REF}/R_{SENSE}$$

$R_{REF}$ 270 and $R_{SENSE}$ 280 are resistances. Since the current $I_L$ 250 is less than the current $I_{REF}$ 260, the MOSFET switch 290 is completely closed and the OTA 300 forces an output voltage equal to the supply voltage ($V_{SUPPLY}$ 310) and thus, the gate to source voltage on the MOSFET switch 290 is also equal to $V_{SUPPLY}$ 310. In regulation mode, the current $I_L$ 250 is limited once it reaches a pre-set limit:

$$I_L = I_{REF} \cdot R_{REF}/R_{SENSE}$$

It will be appreciated by one skilled in the art that thermal threshold detection and overcurrent detection are well known and can be achieved by various methods.

While various embodiments have been described above, it should be understood that they have been presented by way of example only, and not limitation. Thus, the breadth and scope of a preferred embodiment should not be limited by any of the above described exemplary embodiments, but in accordance with the true spirit and scope of the present invention.

What is claimed is:

1. A multi-channel power shut-down circuit comprising:

a plurality of channel disabler circuits formed on a common substrate, where each of said channel disabler circuits includes first combinational logic, second combinational logic having an input coupled to an output of said first combinational logic and having a channel disable output, and a channel overcurrent detector coupled to an input of said first combinational logic;

a thermal warning detector formed on said common substrate and coupled to inputs of said first combinational logic of said plurality of channel disabler circuits; and a thermal shutdown detector formed on said common substrate and coupled to inputs of said second combinational logic of said plurality of channel disabler circuits.

2. The circuit as recited in claim 1, wherein said first combinational logic comprises a flipflop having a set input, a reset input and an output, an AND gate having a first input coupled to an output of said thermal warning detector and a second input coupled to an output of said overcurrent detector and an output coupled to said set input of said flipflop, and a NOR gate having a first input coupled to an output of said overcurrent detector and a second input coupled to said thermal warning detector and an output coupled to said reset input of said flipflop.

3. The circuit as recited in claim 2, wherein said second combinational logic comprises an OR gate having a first input coupled to said output of said flipflop and a second input connected to an output of said thermal shutdown detection.

4. The circuit as recited in claim 1, wherein a particular channel is shutdown when an overcurrent detector threshold for said particular channel and a thermal warning detector threshold are reached.

5. The circuit as recited in claim 1, wherein all channels are shutdown when the thermal shutdown detector threshold is reached.

6. The circuit as recited in claim 1 wherein said thermal shutdown detector threshold is higher than said thermal warning detector threshold.

7. A method for powering down multiple channels comprising:

individually monitoring each of a plurality of channels for an overcurrent condition;

developing a thermal warning signal at a first temperature;

developing a thermal shutdown signal at a second temperature greater than said first temperature;

shutting down a channel upon an occurrence of an overcurrent condition for that channel and upon an occurrence of said thermal warning signal; and shutting down all of said plurality of channels upon an occurrence of said thermal shutdown signal.

8. The method of claim 7 further comprising subsequently automatically powering up a channel after said channel no longer has an overcurrent condition and after the termination of said thermal warning signal and said thermal shutdown signal.

9. A motherboard system with multiple hot swap daughterboards comprising:

a plurality of corresponding channels for said hot swap daughterboards to plug into;

a multi-channel power shut-down circuit on a singular substrate coupled to said corresponding channels wherein said multi-channel power shut-down circuit controls the power to each of said hot swap daughterboards, and wherein said multi-channel power shut-down circuit shuts off power to one said hot swap daughterboards upon the occurrence of a first over-temperature and an over-current condition; and a power supply coupled to said multi-channel power shut-down circuit through said motherboard.

10. The system as recited in claim 9, wherein said hot swap daughterboards can be replaced when power is shut off to an individual corresponding channel while the other said corresponding channels are still powered up.

11. The system of claim 9, wherein the power to all of said hot swap daughterboards is shut off upon the occurrence of a second over-temperature condition at a greater temperature than said first over-temperature condition.

12. The system of claim 11, where the power to said individual hot swap daughterboard is restored upon termination of said first and second over-temperature conditions and termination of said over-current condition.

* * * * *